United States Patent
Mito et al.

(10) Patent No.: US 11,835,483 B2
(45) Date of Patent: Dec. 5, 2023

(54) MAGNETIC FLAW DETECTION METHOD, MAGNETIC FIELD MEASUREMENT PROCESSING APPARATUS, AND MAGNETIC FLAW DETECTION APPARATUS

(71) Applicant: YOKOGAWA ELECTRIC CORPORATION, Tokyo (JP)

(72) Inventors: Shinya Mito, Tokyo (JP); Kazunori Miyazawa, Tokyo (JP); Fumitake Terao, Tokyo (JP); Shoma Takeda, Tokyo (JP); Shoichi Shiosaki, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/911,050

(22) PCT Filed: Mar. 4, 2021

(86) PCT No.: PCT/JP2021/008545
§ 371 (c)(1),
(2) Date: Sep. 12, 2022

(87) PCT Pub. No.: WO2021/182310
PCT Pub. Date: Sep. 16, 2021

(65) Prior Publication Data
US 2023/0108846 A1    Apr. 6, 2023

(30) Foreign Application Priority Data
Mar. 13, 2020 (JP) ................. 2020-044811

(51) Int. Cl.
G01N 27/83        (2006.01)
(52) U.S. Cl.
CPC .................... G01N 27/83 (2013.01)

(58) Field of Classification Search
CPC ..................................... G01N 27/83
(Continued)

(56) References Cited

U.S. PATENT DOCUMENTS

| | | | |
|---|---|---|---|
| 6,549,005 B1 | 4/2003 | Hay et al. | |
| 2007/0170228 A1* | 7/2007 | Zhao | B81B 7/0074 228/102 |

(Continued)

FOREIGN PATENT DOCUMENTS

| | | | |
|---|---|---|---|
| CN | 105445362 A * | 3/2016 | G01N 27/85 |
| JP | 3-96855 A | 4/1991 | |

(Continued)

OTHER PUBLICATIONS

Wang, Ping, et al. "Velocity effect analysis of dynamic magnetization in high speed magnetic flux leakage inspection." Ndt & E International 64 (2014): 7-12. (Year: 2014).*

(Continued)

Primary Examiner — Christopher P McAndrew
(74) Attorney, Agent, or Firm — Rankin, Hill & Clark LLP

(57) ABSTRACT

A magnetic flaw detection method includes a magnetization step (S2) of moving a magnet (21) in a predetermined direction (D) along a surface of an object (7) that is a magnetic body and subsequently removing the magnet (21) from the surface of the object (7) to magnetize a region (R) corresponding to a movement range of the magnet (21) on the object (7), a sensor arrangement step (S3) of arranging a magnetic sensor (35a) to be capable of measuring magnetic flux leakage (8) generated from an abnormal portion (72) of the region (R) that was magnetized in the object (7), and a detection step (S4) of detecting an abnormality in the region (R) with the magnetic sensor (35a) arranged by the sensor arrangement step (S3).

10 Claims, 7 Drawing Sheets

(58) Field of Classification Search
USPC .......................................................... 324/240
See application file for complete search history.

(56) References Cited

U.S. PATENT DOCUMENTS

| | | | | |
|---|---|---|---|---|
| 2013/0277836 | A1* | 10/2013 | Jensen | H01L 24/24 |
| | | | | 257/737 |
| 2015/0002144 | A1* | 1/2015 | Boecker | G01N 27/9026 |
| | | | | 324/240 |
| 2015/0285768 | A1* | 10/2015 | Kwun | G01N 29/22 |
| | | | | 324/240 |
| 2015/0323502 | A1* | 11/2015 | Suetsugu | G01N 27/902 |
| | | | | 324/240 |
| 2015/0330946 | A1 | 11/2015 | Davis et al. | |
| 2015/0346153 | A1* | 12/2015 | Boyd | G01N 27/82 |
| | | | | 324/240 |
| 2017/0148757 | A1* | 5/2017 | Nishiyama | G01R 33/0206 |

FOREIGN PATENT DOCUMENTS

| | | | |
|---|---|---|---|
| JP | 6-87861 | U | 12/1994 |
| JP | 2000215428 | A * | 8/2000 |
| JP | 2006-177747 | A | 7/2006 |
| JP | 2017-516111 | A | 6/2017 |
| WO | 2015/179237 | A1 | 11/2015 |
| WO | 2020/027043 | A1 | 2/2020 |

OTHER PUBLICATIONS

Ping Wang et al., "Velocity effect analysis of dynamic magnetization in high speed magnetic flux leakage inspection", NDT&E International, vol. 64, 2014, pp. 7-12, https://doi.org/10.1016/j.ndteint.2014.02.001; Cited in Australian Office Action dated Jul. 31, 2023.

* cited by examiner

MAGNETIC FLAW DETECTION METHOD, MAGNETIC FIELD MEASUREMENT PROCESSING APPARATUS, AND MAGNETIC FLAW DETECTION APPARATUS

CROSS-REFERENCE TO RELATED APPLICATION

The present application claims priority to Japanese Patent Application No. 2020-44811 filed on Mar. 13, 2020, the entire contents of which are incorporated herein by reference.

TECHNICAL FIELD

The present disclosure relates to a magnetic flaw detection method and a magnetic flaw detection apparatus.

BACKGROUND

A magnetic flaw detection method and a magnetic flaw detection apparatus for detecting abnormalities in magnetic objects using a magnetic flux leakage flaw detection method are known. For example, see Patent Literature (PTL) 1. A magnetic flux leakage flaw detection method is a method for detecting abnormalities in an object by using a magnetic sensor to detect magnetic flux leakage occurring in an abnormal portion, which is a portion of the object, with an abnormality such as wear or damage.

CITATION LIST

Patent Literature

PTL 1: US 2015/0330946 A1

SUMMARY

Technical Problem

Demand exists for a magnetic flaw detection method and a magnetic flaw detection apparatus capable of efficiently detecting abnormalities in objects such as pipes, columns, or beams in plants, bridges, and other structures.

It is an aim of the present disclosure to provide a magnetic flaw detection method and a magnetic flaw detection apparatus capable of efficiently detecting abnormalities in an object.

Solution to Problem

A magnetic flaw detection method according to an embodiment includes a magnetization step of moving a magnet in a predetermined direction along a surface of an object that is a magnetic body and subsequently removing the magnet from the surface of the object to magnetize a region corresponding to a movement range of the magnet on the object; a sensor arrangement step of arranging a magnetic sensor to be capable of measuring magnetic flux leakage generated from an abnormal portion of the region that was magnetized in the object; and a detection step of detecting an abnormality in the region with the magnetic sensor arranged by the sensor arrangement step. According to this configuration, a region larger than the magnet can be magnetized in the object, thus enabling efficient detection of an abnormality in the object, such as the existence, position, or size of an abnormal portion. The magnetic sensor is, for example, configured by a Hall element, a magnetoresistive element, a magnetoimpedance effect element, or other magneto-sensitive element.

In an embodiment, in the sensor arrangement step, a magnetic sensor group including the magnetic sensor is arranged, and $L1 \geq L2$, where L1 is a moving distance of the magnet in the predetermined direction in the magnetization step, and L2 is a length in the predetermined direction of the magnetic sensor group arranged to be capable of measuring the magnetic flux leakage. According to this configuration, a region of suitable size for the magnetic sensor group can be magnetized regardless of the size of the magnets, thus enabling a reduction in size of the magnets and more efficient detection of abnormalities in the object.

In an embodiment, in the sensor arrangement step, the magnetic sensor group is arranged so that each magnetic sensor in the magnetic sensor group can measure the magnetic flux leakage. According to this configuration, abnormalities in the object can be detected more efficiently.

An embodiment includes a preparation step of preparing, by testing or calculation in advance, an intensity distribution of remanent magnetization in the region to be magnetized by the magnetization step, wherein in the sensor arrangement step, the magnetic sensor is arranged based on the intensity distribution of the remanent magnetization prepared by the preparation step. According to this configuration, the magnetic sensor can be arranged appropriately, thus enabling more efficient detection of abnormalities in the object.

In an embodiment, the detection step includes a measurement step of measuring the magnetic flux leakage with the magnetic sensor and a determination step of determining the abnormality in the region based on the magnetic flux leakage measured by the measurement step and the intensity distribution, prepared by the preparation step, of the remanent magnetization. According to this configuration, an abnormality in the region magnetized by the magnetizing step can be detected with high accuracy by the detection being based on the magnetic flux leakage measured by the magnetic sensor and the prepared intensity distribution of the remanent magnetization.

In an embodiment, the object extends along a straight or curved axis, the predetermined direction is a direction extending along the axis, and the magnetization step includes a magnet arrangement step of arranging the magnet so that the magnet forms a ring surrounding the object in a circumferential direction that encircles the axis, a magnet movement step of moving the magnet arranged by the magnet arrangement step in the predetermined direction, and a magnet removal step of removing the magnet from the object after the magnet movement step. According to this configuration, the object can be magnetized uniformly in the circumferential direction, thus enabling highly accurate detection of abnormalities in the object.

In an embodiment, the object is a pipe. According to this configuration, for example, the existence, position, size, and the like of a locally thin portion on the inner surface of the pipe can be efficiently detected as an abnormality of the object.

In an embodiment, the magnet has different polarities in the predetermined direction. According to this configuration, the object can be magnetized more uniformly, thus enabling more accurate detection of abnormalities in the object.

In an embodiment, in the detection step, an abnormality in the region magnetized by the magnetization step is repeatedly detected over a predetermined period of time. According to this configuration, abnormalities in the object can be monitored efficiently.

A magnetic field measurement processing apparatus according to an embodiment includes a storage configured to store model data that is prepared by testing or calculation in advance and indicates an intensity distribution of remanent magnetization in a region to be magnetized by a magnetization step of moving a magnet in a predetermined direction along a surface of an object that is a magnetic body and subsequently removing the magnet from the surface of the object to magnetize a region corresponding to a movement range of the magnet on the object; a magnetic sensor arranged to be capable of measuring magnetic flux leakage generated from an abnormal portion of the region actually magnetized by the magnetization step; and a determiner configured to determine an abnormality in the region based on the model data and the magnetic flux leakage detected by the magnetic sensor. According to this configuration, a region larger than the magnet can be magnetized in the object, thus enabling efficient detection of an abnormality in the object. Furthermore, according to this configuration, an abnormality in the region magnetized by the magnetizing step can be detected with high accuracy by the detection being based on the model data and the magnetic flux leakage detected by the magnetic sensor.

In an embodiment, a magnetic sensor group including the magnetic sensor is included, and $L1 \geq L2$, where L1 is a moving distance of the magnet in the predetermined direction in the magnetization step, and L2 is a length in the predetermined direction of the magnetic sensor group arranged to be capable of measuring the magnetic flux leakage. According to this configuration, a region of suitable size for the magnetic sensor group can be magnetized regardless of the size of the magnets, thus enabling a reduction in size of the magnets and more efficient detection of abnormalities in the object.

In an embodiment, the determiner repeatedly, over a predetermined period of time, determines an abnormality in the region magnetized by the magnetization step. According to this configuration, abnormalities in the object can be monitored efficiently.

A magnetic flaw detection apparatus according to an embodiment includes the aforementioned magnetic field measurement processing apparatus and the magnet, wherein the object extends along a straight or curved axis, the predetermined direction is a direction extending along the axis, and the magnet is an openable and closable annular magnet configured to surround the object in a circumferential direction that encircles the axis. According to this configuration, the object can be magnetized uniformly in the circumferential direction, thus enabling highly accurate detection of abnormalities in the object.

Advantageous Effect

According to the present disclosure, a magnetic flaw detection method and a magnetic flaw detection apparatus capable of efficiently detecting abnormalities in an object can be provided.

DETAILED DESCRIPTION

Embodiments of the present disclosure are described below with reference to the drawings.

Figure 1:
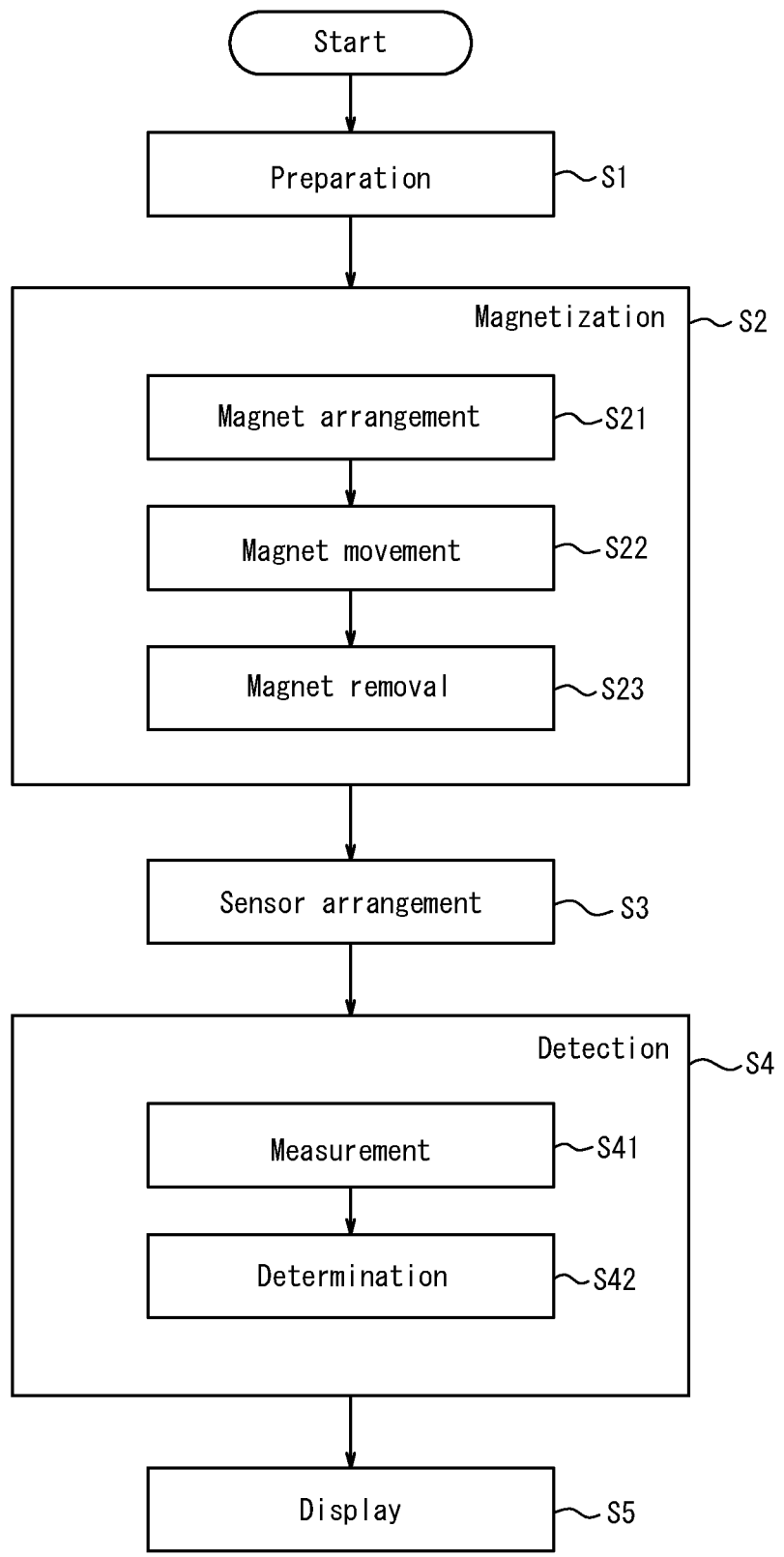
FIG. 1 is a flowchart illustrating a magnetic flaw detection method according to an embodiment.

The magnetic flaw detection method according to an embodiment of the present disclosure illustrated in FIG. 1 includes a preparation step S1, a magnetization step S2, a sensor arrangement step S3, a detection step S4, and a display step S5. The magnetic flaw detection method according to an embodiment is implemented using a magnetic flaw detection apparatus 1 illustrated in FIG. 2. The magnetic flaw detection apparatus 1 includes a magnetizing apparatus 2, a magnetic field measurement apparatus 3, a processing apparatus 4, and a display apparatus 5. The magnetic field measurement apparatus 3 and the processing apparatus 4 form a magnetic field measurement processing apparatus 6. The magnetic flaw detection method according to the present embodiment uses a magnetic flux leakage flaw detection method to detect abnormalities in a pipe 71 (see FIG. 3) as an object 7, which is a magnetic body, and more specifically detects the existence, position, size, and the like of a locally thin portion caused by corrosion or the like. Abnormalities in the pipe 71 usually occur on the inner surface thereof. However, the magnetic flaw detection method according to the present embodiment is not limited to detecting abnormalities on the inner surface of the pipe 71 but can also detect abnormalities on the outer surface or the interior of the pipe 71. The pipe 71 is installed in a plant, bridge, or other structure. The pipe 71 extends along a linear axis O.

Figure 2:
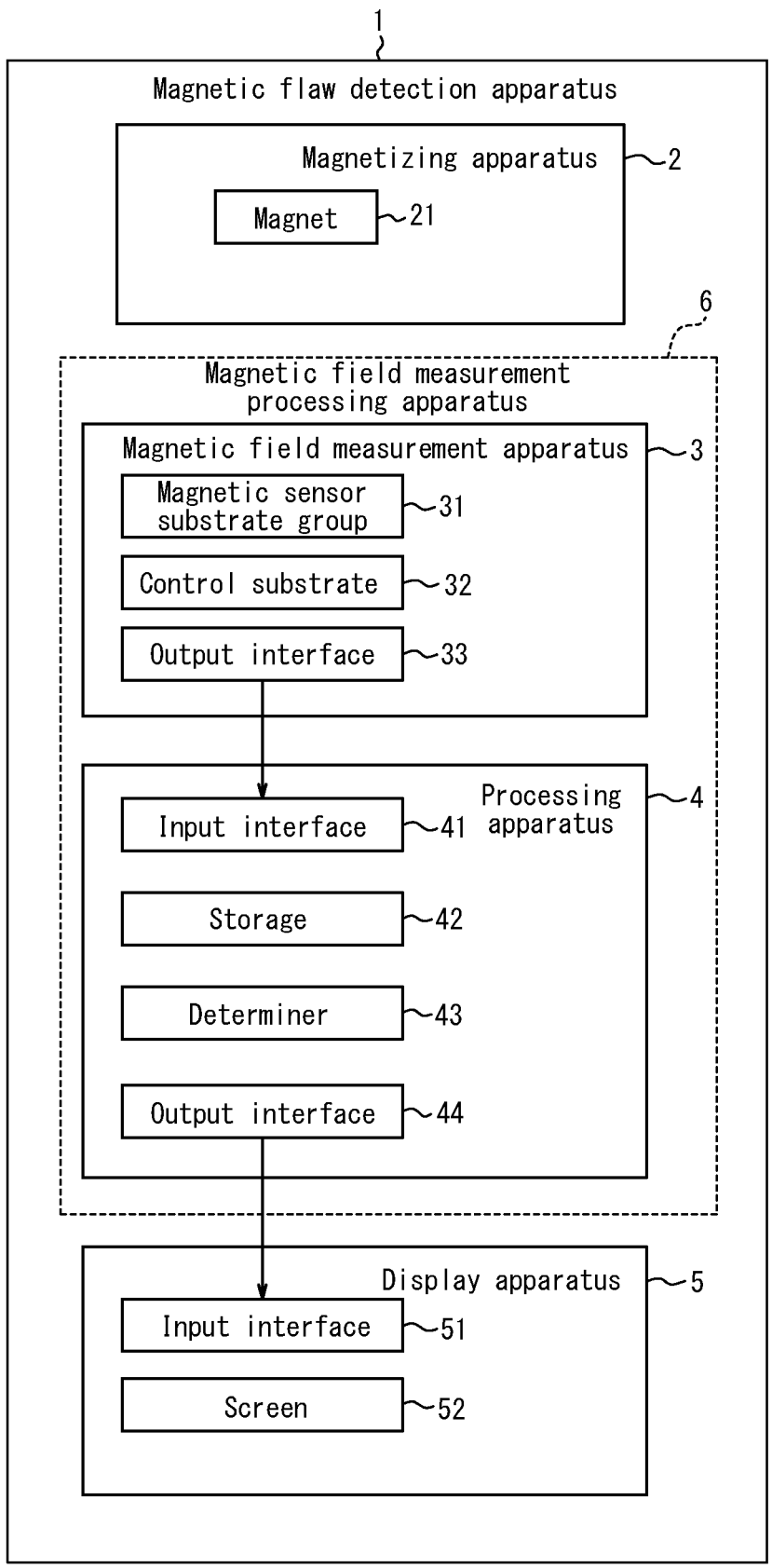
FIG. 2 is a block diagram illustrating a magnetic flaw detection apparatus used in the magnetic flaw detection method illustrated in FIG. 1.
Figure 3:
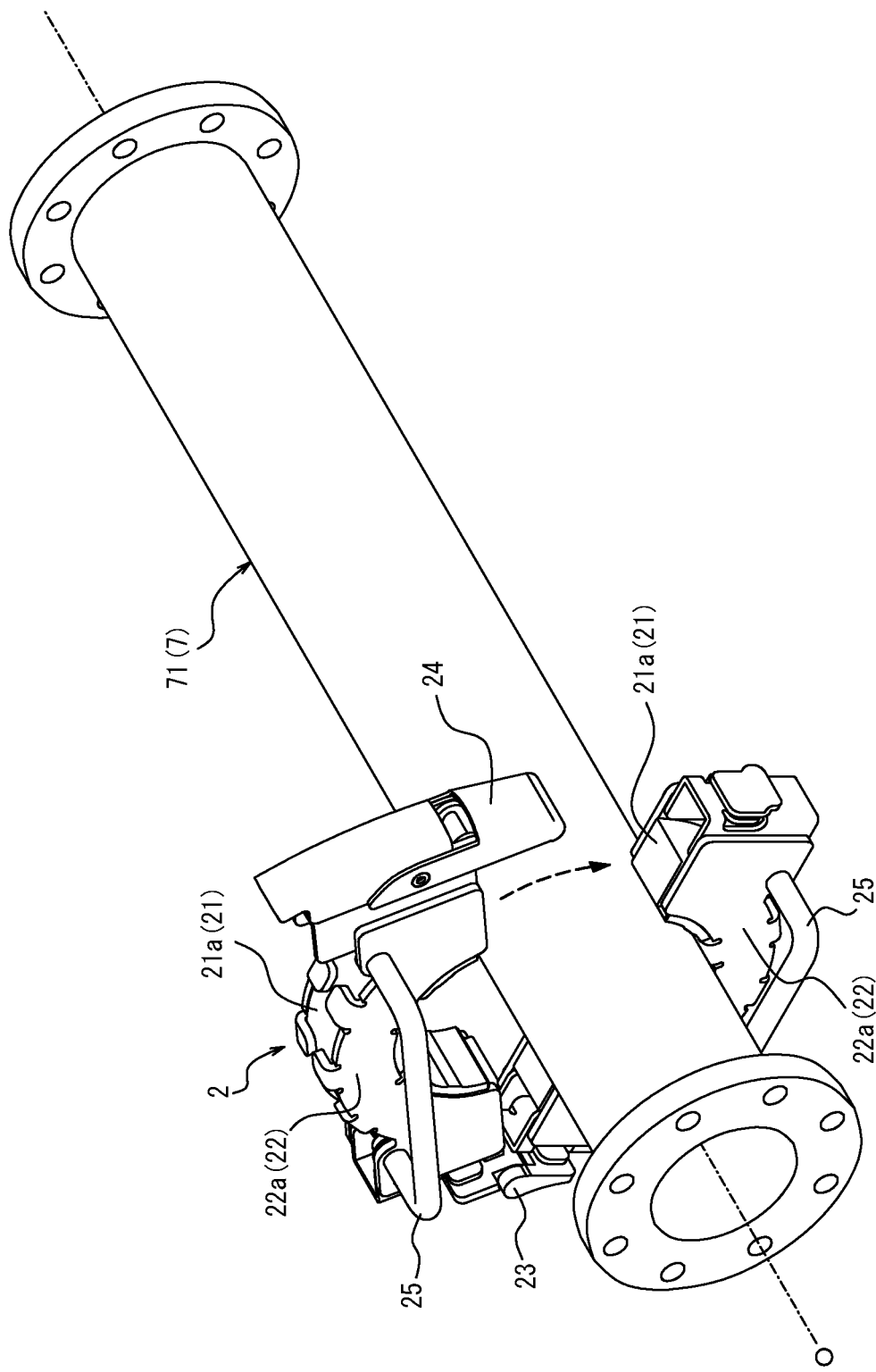
FIG. 3 is an external view of a magnetizing apparatus illustrated in FIG. 2 while in the process of being arranged on the object.
Figure 4:
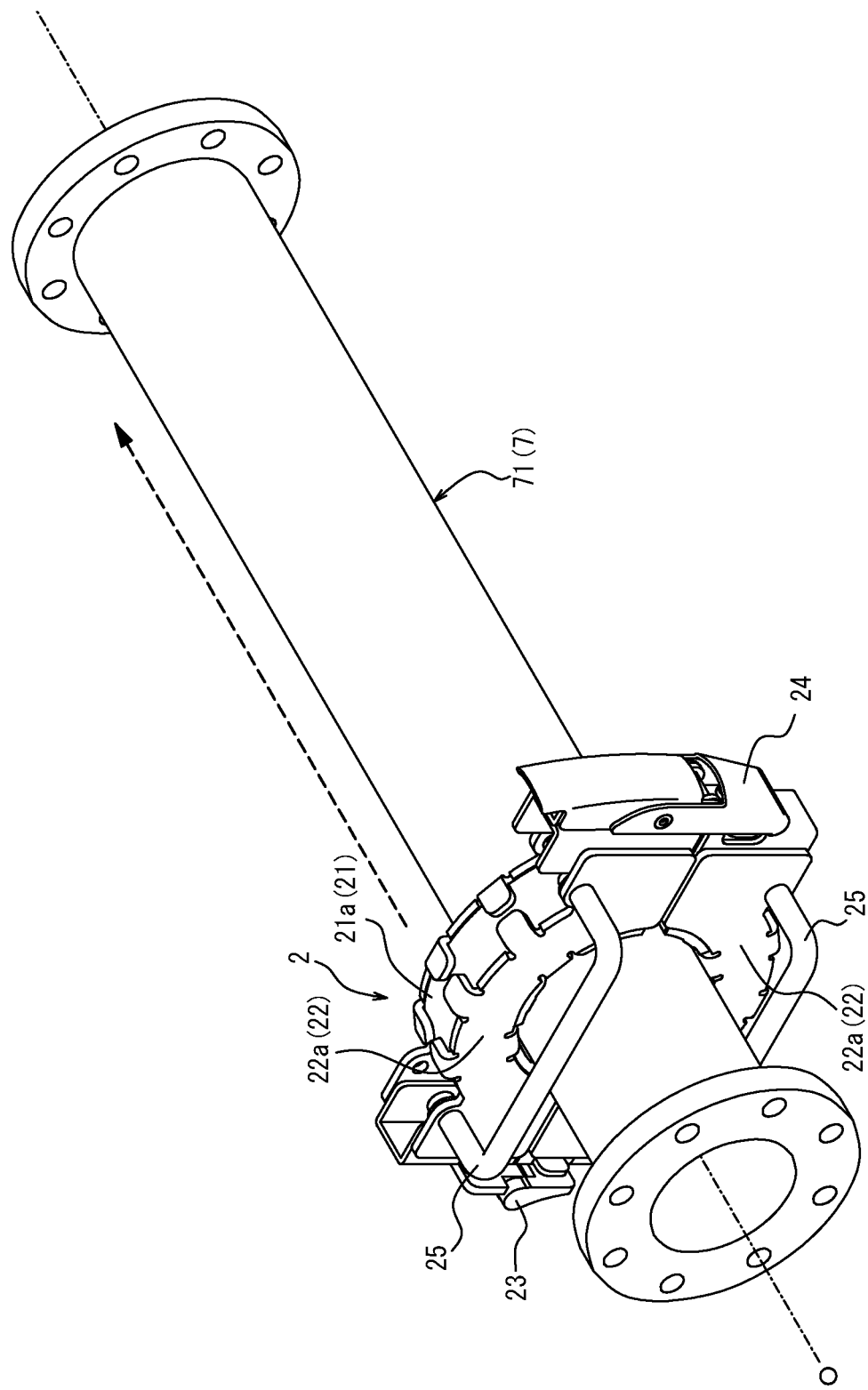
FIG. 4 is an external view of the magnetizing apparatus when arrangement on the object is completed after the state illustrated in FIG. 3.

As illustrated in FIG. 2, the magnetizing apparatus 2 has a magnet 21. As illustrated in FIGS. 3 and 4, the magnet 21 includes two semi-cylindrical portions 21a that are arranged substantially concentrically with the pipe 71 when the magnet 21 is arranged against the pipe 71. Each of the portions 21a of the magnet 21 is partially covered by a portion 22a of a case 22. The two portions 22a of the case 22 are rotatable, with respect to each other, via a hinge 23. Accordingly, the magnet 21 is an annular magnet that surrounds the object 7 in the circumferential direction, which is the direction encircling the axis O, and that can be opened and closed by rotation via the hinge 23. The magnet 21 has different polarities in the direction along the axis O when the magnet 21 is arranged against the pipe 71 (see FIG. 6).

As illustrated in FIGS. 3 and 4, at both ends of the case 22 in the circumferential direction, a locking mechanism 24 that holds the magnet 21 closed is provided. As illustrated in FIGS. 3 and 4, the locking mechanism 24 is configured by a toggle latch. By the locking mechanism 24 being locked, the magnet 21 can be held closed (state illustrated in FIG. 4), and by the locking mechanism 24 being released, the magnet 21 can be opened (state illustrated in FIG. 3). After the magnet 21 is opened and the pipe 71 is arranged on the inside of the magnet 21, the magnet 21 can be closed, as illustrated by the dashed arrow in FIG. 3, and the locking mechanism 24 can be locked to attach the magnet 21 to the pipe 71. Each portion 22a of the case 22 is provided with a handle 25. By the handles 25 being grasped, the magnetizing apparatus 2 can be easily moved along the pipe 71 as illustrated by the dashed arrow in FIG. 4.

By performance of the below-described magnetization step S2 using the magnetizing apparatus 2, the below-described region R (see shaded area in FIG. 5) of the pipe 71 can be magnetized.

Figure 5:
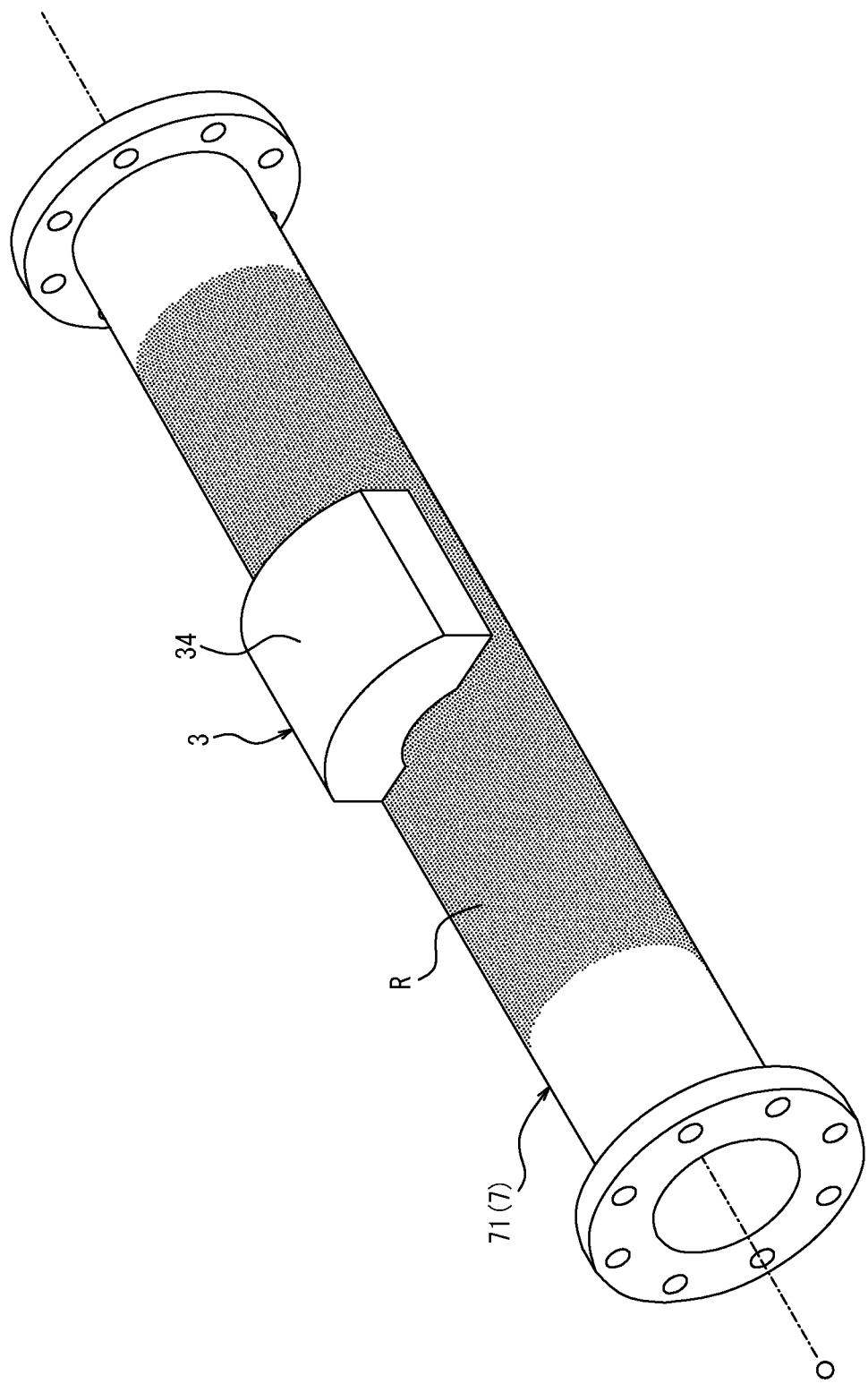
FIG. 5 is an external view of the state when a magnetic field measurement apparatus illustrated in FIG. 2 is arranged after the magnetizing apparatus in the state illustrated in FIG. 4 has been moved along the object and removed from the object.

As illustrated in FIG. 2, the magnetic field measurement apparatus 3 includes a magnetic sensor substrate group 31, a control board 32, and an output interface 33. As illustrated in FIG. 5, the magnetic field measurement apparatus 3 is arranged against the magnetized region R of the pipe 71. As illustrated in FIG. 5, the magnetic field measurement apparatus 3 includes a housing 34 that houses the magnetic sensor substrate group 31, the control board 32, and the output interface 33.

Figure 7:
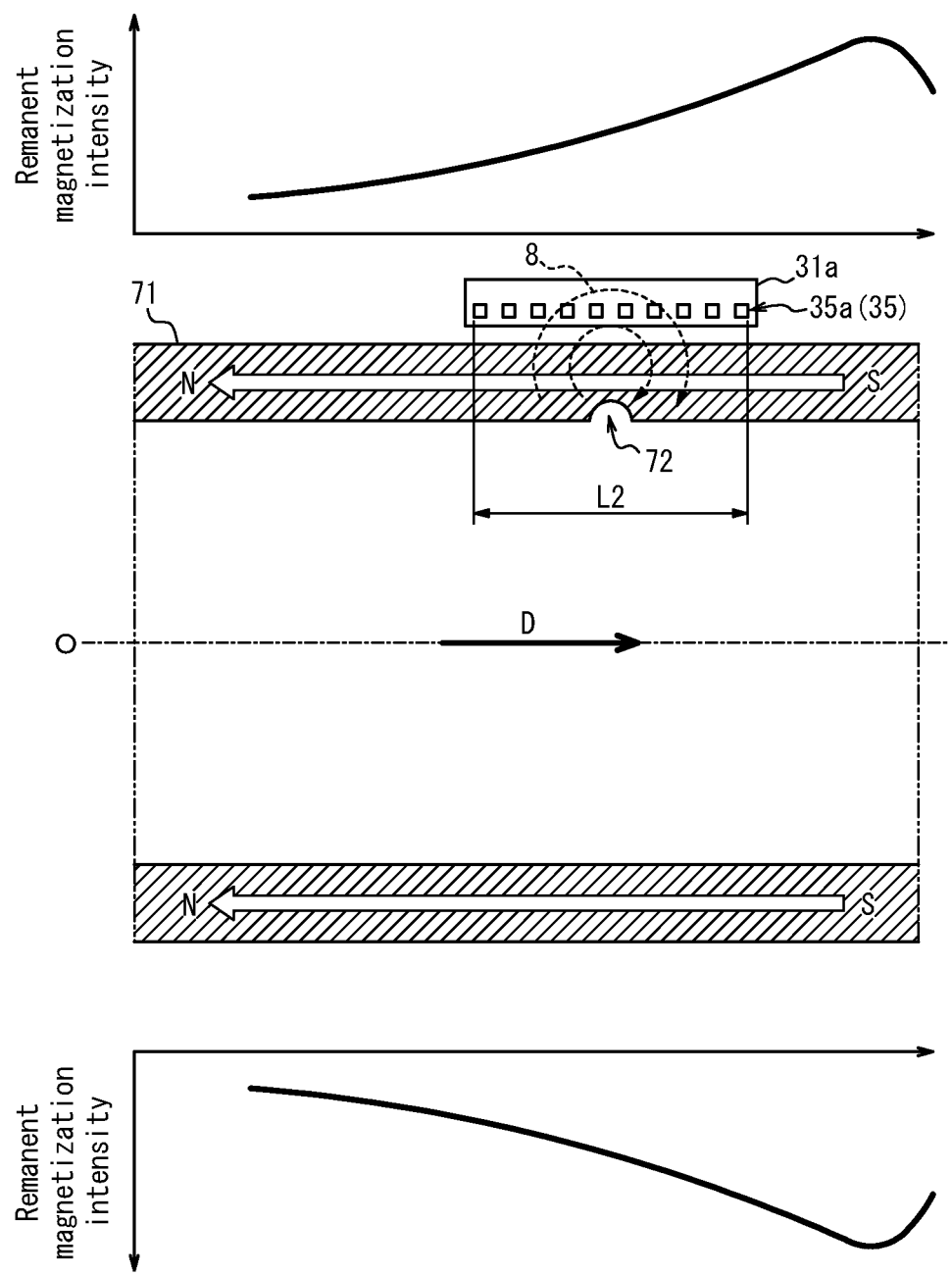
FIG. 7 is a conceptual diagram illustrating magnetic flux leakage during detection of an abnormality in an object by the detection step illustrated in FIG. 1.

The magnetic sensor substrate group 31 is formed by a plurality of flat magnetic sensor substrates 31a (see FIG. 7). Each magnetic sensor substrate 31a includes a magnetic sensor group 35 formed by a plurality of (more specifically, ten) magnetic sensors 35a aligned in the direction along the axis O when the magnetic field measurement apparatus 3 is arranged against the pipe 71. Each magnetic sensor 35a is, for example, configured by a Hall element, a magnetoresistive element, a magnetoimpedance effect element, or other magneto-sensitive element. Each magnetic sensor 35a can, for example, measure magnetism along one axis, two orthogonal axes, or three orthogonal axes.

The control board 32 controls the operations of the magnetic sensor substrate group 31. The output interface 33 outputs a physical quantity group corresponding to magnetic flux leakage 8 (see FIG. 7) measured by the magnetic sensor group 35 of the magnetic sensor substrate group 31.

As illustrated in FIG. 2, the processing apparatus 4 includes an input interface 41, a storage 42, a determiner 43, and an output interface 44. The input interface 41 receives the physical quantity group outputted by the output interface 33 of the magnetic field measurement apparatus 3 by wireless or wired communication. The storage 42 stores model data, prepared in advance by testing or calculation, that indicates an intensity distribution of remanent magnetization (see FIG. 6) in the region R to be magnetized by the magnetization step S2, described below. The determiner 43 determines the existence, position, size, and the like of a locally thin portion on the inner surface of the region R based on the model data stored in the storage 42 and the physical quantity group received by the input interface 41. The output interface 44 outputs the determination results of the determiner 43. The processing apparatus 4 is configured by a computer that includes a processor.

The display apparatus 5 includes an input interface 51 and a screen 52. The input interface 51 receives the determination results outputted by the output interface 44 of the processing apparatus 4 by wireless or wired communication. The screen 52 displays the determination results received by the input interface 51.

The magnetic field measurement apparatus 3, the processing apparatus 4, and the display apparatus 5 are configured as separate apparatuses from each other. However, the magnetic field measurement apparatus 3, the processing apparatus 4, and the display apparatus 5 may be configured as a single apparatus in which two or all of these apparatuses are integrated. A portion or all of the functions of the processing apparatus 4 may be realized by the cloud.

The preparation step S1 illustrated in FIG. 1 is a step of preparing, by testing or calculation in advance, the intensity distribution of the remanent magnetization in the region R to be magnetized by the magnetization step S2, described below. In the preparation step S1, model data, prepared in advance by testing or calculation, that indicates the intensity distribution of remanent magnetization in the region R to be magnetized by the magnetization step S2, is stored in the storage 42. The testing is preferably conducted using the same type of pipe 71 and magnetizing apparatus 2 actually to be used in the magnetization step S2, and by magnetizing the pipe 71 in the same manner as in the magnetization step S2. The calculation is, for example, performed by computer simulation. Various cases are preferably assumed, and a plurality of model data sets corresponding to the cases are preferably stored in the storage 42 for selection and use of the appropriate model data.

The magnetization step S2 is a step of moving the magnet 21 in a predetermined direction D (see FIG. 6) along the surface of the pipe 71 and subsequently removing the magnet 21 from the surface of the pipe 71 to magnetize a region R (see FIGS. 3 to 5) corresponding to the movement range of the magnet 21 on the pipe 71. The predetermined direction D is a direction extending along the axis O.

The magnetization step S2 includes a magnet arrangement step S21, a magnet movement step S22, and a magnet removal step S23. The magnet arrangement step S21 is a step of arranging the magnet 21 so that the magnet 21 forms a ring surrounding the pipe 71 in the circumferential direction. In the magnet arrangement step S21, the magnet 21 of the magnetizing apparatus 2 is attached to the pipe 71. The magnet movement step S22 is a step of moving the magnet 21 arranged by the magnet arrangement step S21 in the predetermined direction D. The magnet removal step S23 is a step of removing the magnet 21 from the object 7 after the magnet movement step S22. In the magnet removal step S23, the magnet 21 is opened by releasing the locking mechanism 24, and the magnetizing apparatus 2 is removed from the pipe 71.

Figure 6:
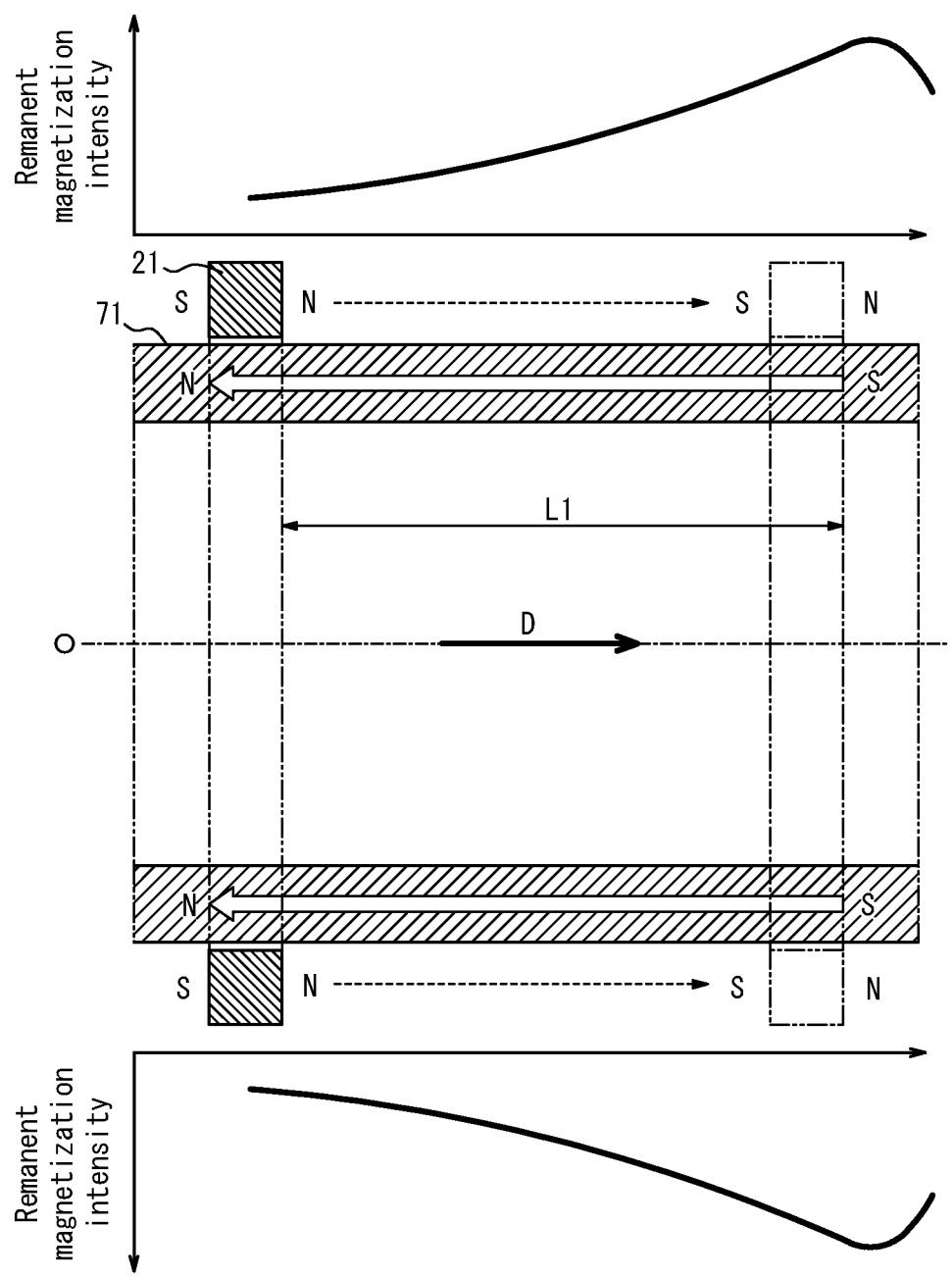
FIG. 6 is a conceptual diagram illustrating an intensity distribution of remanent magnetization when the object is magnetized by the magnetization step illustrated in FIG. 1.

Remanent magnetization can be imparted to the pipe 71 by performance of the magnetization step S2, as illustrated in FIG. 6. In a case in which the end of the magnet 21 on the side of the predetermined direction D is the N-pole, the remanent magnetization imparted to the region R of the pipe 71 has the S-pole at the end on the side of the predetermined direction D. The intensity distribution of the remanent magnetization generally tends to increase gradually in intensity from the beginning to the end of the movement of the magnet 21 and to decrease in intensity slightly beyond the end.

As illustrated in FIG. 7, the sensor arrangement step S3 is a step of arranging the magnetic sensor 35a to be capable of measuring the magnetic flux leakage 8 generated from an abnormal portion 72 of the magnetized region R (i.e., the locally thin portion generated on the inner surface of the region R) of the pipe 71. In the sensor arrangement step S3, the magnetic sensor group 35, i.e. the magnetic field measurement apparatus 3, is arranged so that each magnetic sensor 35a in the magnetic sensor group 35 can measure the magnetic flux leakage 8. At this time, the magnetic field measurement apparatus 3 is arranged based on the intensity distribution prepared by the preparation step S1, thereby ensuring a reliable arrangement. To increase the accuracy of abnormality detection in the region R during the detection step S4, the measurement accuracy of the magnetic flux leakage 8 by the magnetic sensors 35a is preferably high, and/or the distribution of the magnetic flux leakage 8 is preferably simple. To achieve the former, the magnetic flux leakage 8 is preferably large. To achieve the latter, the distribution of the remanent magnetization in the region R is preferably uniform. A large remanent magnetization is obtained near the end of movement of the magnet 21, as described above, but the operation of removing the magnetizing apparatus 2 from the pipe 71 in the magnet removal step S23 may cause the remanent magnetization to become non-uniform. Therefore, the magnetic sensors 35a are preferably arranged slightly before the end in the region R, as illustrated in FIG. 7.

L1≥L2, where L1 (see FIG. 6) is the moving distance of the magnet 21 in the predetermined direction D in the magnetization step S2, and L2 (see FIG. 7) is the length in the predetermined direction D of the magnetic sensor group 35 arranged to be capable of measuring the magnetic flux leakage 8. Therefore, since a region R of suitable size for the magnetic sensor group 35 can be magnetized regardless of the size of the magnet 21, the magnet 21 can be reduced in size. Depending on the size of the magnet 21, the relationship L1≥L2 may not need to be satisfied. In other words, L1 may be smaller as the magnet 21 is larger in the predetermined direction D.

The detection step S4 illustrated in FIG. 1 is a step of detecting an abnormality in the region R with the magnetic sensors 35a arranged by the sensor arrangement step S3. In the detection step S4, abnormalities in the region R are repeatedly detected over a predetermined period of time. The detection step S4 includes a measurement step S41 and a determination step S42.

The measurement step S41 is the step of measuring the magnetic flux leakage 8 generated from the abnormal portion 72 of the region R with the magnetic sensors 35a. In the measurement step S41, the magnetic flux leakage 8 is measured by the magnetic sensor group 35 of the magnetic sensor substrate group 31.

The determination step S42 is a step of determining the abnormality in the region R based on the magnetic flux leakage 8 measured by the measurement step S41. In the determination step S42, the abnormality in the region R is determined based on the magnetic flux leakage 8 measured by the measurement step S41 and the intensity distribution, prepared by the preparation step S1, of the remanent magnetization in the region R. In the determination step S42, the determiner 43 determines the existence, position, size, and the like of the abnormal portion 72 on the inner surface of the region R, i.e. a locally thin portion, based on the physical quantity group corresponding to the magnetic flux leakage 8 measured by the magnetic sensor group 35 of the magnetic sensor substrate group 31 and the model data stored in the storage 42.

The determination of the abnormal portion 72 by the determination step S42 depends on the position relative to the region R, in the predetermined direction D, of the arranged magnetic sensor group 35. Therefore, the processing apparatus 4 is preferably configured so that the position of the actually arranged magnetic sensor group 35 is inputted to the processing apparatus 4 and used in the determination, or the position at which the magnetic sensor group 35 should actually be arranged is preferably established in advance as a recommended position.

A variety of more specific methods for detecting abnormalities are possible, but one example is as follows.

First, a physical quantity group corresponding to the magnetic flux leakage 8 is acquired n times by the magnetic sensor group 35.

Next, from the n instances of the physical quantity group, two instances are extracted, i.e., a physical quantity group i and a physical quantity group j (1≤i≤n, and 1≤j≤n). The difference between the physical quantity group i and the physical quantity group j is then calculated to yield a differential physical quantity group. Differential physical quantity groups for reference, corresponding to various patterns of abnormality (position, size, and the like of locally thin portion) are prepared in advance and stored in the storage 42. The differential physical quantity groups are sequentially compared with the reference differential physical quantity groups stored in the storage 42, and one matching degree, which indicates the degree of matching between them, is obtained for each reference differential physical quantity group. The greatest matching degree among the obtained matching degrees is selected, and the selected matching degree is compared with a predetermined threshold that is stored in the storage 42. In a case in which the matching degree is equal to or greater than the threshold, it is determined that the abnormality for the pattern corresponding to the reference differential physical quantity group with the greatest matching degree occurred or progressed between the times when the physical quantity group i and the physical quantity group j were obtained. In a case in which the matching degree is less than the threshold, it is determined that no abnormality has occurred or progressed between the times when the physical quantity group i and the physical quantity group j were obtained.

A thermometer may be provided in the magnetic field measurement apparatus 3, and correction coefficients for sensitivity and offset, including the temperature characteristics of the magnetic sensor 35a, may be stored in the storage 42. Then, before the difference between the physical quantity group i and the physical quantity group j is calculated, these physical quantity groups may be subjected to temperature correction. This can reduce the measurement error of the magnetic flux leakage 8 caused by individual differences in the magnetic sensors 35a or temperature differences between the two measurement times.

The display step S5 illustrated in FIG. 1 is a step of displaying the abnormality in the region R detected in the detection step S4. In the display step S5, the position, size, and the like of the locally thin portion of the region R are displayed on the screen 52.

In the magnetic flaw detection method according to the present embodiment, one pipe 71 is magnetized by only one magnetizing apparatus 2 in the magnetization step S2. However, one pipe 71 may be magnetized by a plurality of magnetizing apparatuses 2 in the magnetization step S2. In this magnetic flaw detection method according to the present embodiment, only one magnetic field measurement apparatus 3 is arranged against one pipe 71 in the sensor arrangement step S3. However, a plurality of magnetic field measurement apparatuses 3 may be arranged against one pipe 71 in the sensor arrangement step S3. In this case, the plurality of magnetic field measurement apparatuses 3 may be arranged against the pipe 71 along the predetermined direction D or along the circumferential direction of the pipe 71.

According to the present embodiment, the pipe 71 can be provided with remanent magnetization equal to or greater than a certain level by the magnetization step S2, thereby enabling highly accurate detection of an abnormality in the pipe 71. According to the present embodiment, the pipe 71 can be provided with a known remanent magnetization by the magnetization step S2, which also enables highly accurate detection of an abnormality in the pipe 71. According to the present embodiment, the pipe 71 can be provided with remanent magnetization that is substantially uniform in the circumferential direction by the magnetization step S2, which also enables highly accurate detection of an abnormality in the pipe 71.

According to the present embodiment, a small magnet 21 can magnetize a sufficiently large region R since the pipe 71 is magnetized by sliding the magnet 21 in the magnetization step S2. Abnormalities can therefore be detected efficiently. According to the present embodiment, the intensity distribution of remanent magnetization prepared by the preparation step S1 is used in the sensor arrangement step S3, thus enabling more efficient and accurate detection of abnormalities. According to the present embodiment, the intensity distribution of remanent magnetization prepared by the preparation step S1 is used in the detection step S4, which also enables more efficient and accurate detection of abnormalities. According to the present embodiment, in the detection step S4, an abnormality in the region R of the pipe 71 is repeatedly detected over a predetermined period of time, thereby enabling efficient monitoring of abnormalities.

The above-described embodiment is only one example of the present disclosure, and various changes may be made, such as those described below.

It suffices for the magnetic flaw detection apparatus 1 according to the above-described embodiment to include the magnet 21, the storage 42, the magnetic sensor 35a, and the determiner 43. The magnetic flaw detection apparatus 1 according to the above-described embodiment need not include the display apparatus 5.

It suffices for the magnetizing apparatus 2 to include the magnet 21. The magnet 21 is not limited to being an openable and closable annular magnet that surrounds the object 7 in the circumferential direction. The magnet 21 is not limited to having different polarities in the predetermined direction D.

It suffices for the storage 42 to store model data that is prepared by testing or calculation in advance and indicates the intensity distribution of remanent magnetization in the region R to be magnetized by the magnetization step S2 of moving the magnet 21 in the predetermined direction D along the surface of the object 7 that is a magnetic body and subsequently removing the magnet 21 from the surface of the object 7 to magnetize the region R corresponding to the movement range of the magnet 21 on the object 7.

It suffices for the magnetic sensor 35a to be arranged so as to be capable of measuring the magnetic flux leakage 8 generated from the abnormal portion 72 of the region R actually magnetized by the magnetization step S2. It suffices for the magnetic field measurement apparatus 3 to include the magnetic sensor 35a. The magnetic field measurement apparatus 3 is not limited to including the magnetic sensor group 35.

It suffices for the determiner 43 to determine an abnormality 62 in the region R based on the model data and the magnetic flux leakage 8 detected by the magnetic sensor 35a. The determiner 43 is not limited to repeatedly determining an abnormality in the region R over a predetermined period of time.

The object 7 can be any magnetic body. The object 7 is not limited to the pipe 71. The object 7 may, for example, be a column, beam, or the like installed in a plant, bridge, or other structure. The pipe 71 or the object 7 is not limited to extending along the linear axis O. For example, the pipe 71 or object 7 may extend along a curved axis O. For example, the pipe 71 may be an L-shaped pipe that bends at a right angle.

It suffices for the magnetic flaw detection method according the above-described embodiment to include the magnetization step S2, the sensor arrangement step S3, and the detection step S4. The magnetic flaw detection method according the above-described embodiment need not include the preparation step S1. The magnetic flaw detection method according the above-described embodiment need not include the display step S5.

The magnetic flaw detection method according the above-described embodiment may be implemented using an apparatus other than the magnetic flaw detection apparatus 1 according to the above-described embodiment.

It suffices for the magnetization step S2 to be a step of moving the magnet 21 in the predetermined direction D along the surface of the object 7 that is a magnetic body and subsequently removing the magnet 21 from the surface of the object 7 to magnetize the region R corresponding to the movement range of the magnet 21 on the object 7.

It suffices for the magnet arrangement step S21 to be a step of arranging the magnet 21 so that the magnet 21 forms a ring surrounding the object 7 in the circumferential direction that encircles the axis O. It suffices for the magnet movement step S22 to be a step of moving the magnet 21 arranged by the magnet arrangement step S21 in the predetermined direction D. It suffices for the magnet removal step S23 to be a step of removing the magnet 21 from the object 7 after the magnet movement step S22.

It suffices for the sensor arrangement step S3 to be a step of arranging the magnetic sensor 35a to be capable of measuring the magnetic flux leakage 8 generated from the abnormal portion 72 of the magnetized region R of the object 7. The sensor arrangement step S3 is not limited to arrangement of the magnetic sensor group 35 so that each magnetic sensor 35a in the magnetic sensor group 35 can measure the magnetic flux leakage 8. The sensor arrangement step S3 is not limited to arrangement of the magnetic sensor 35a based on the intensity distribution, prepared by the preparation step S1, of the remanent magnetization.

It suffices for the detection step S4 to be a step of detecting an abnormality in the region R with the magnetic sensor 35a arranged by the sensor arrangement step S3. The detection step S4 is not limited to repeated detection, over a predetermined period of time, of abnormalities in the region R magnetized by the magnetization step S2.

It suffices for the measurement step S41 to be a step of measuring the magnetic flux leakage 8 with the magnetic sensor 35a. It suffices for the determination step S42 to be a step of determining the abnormality in the region R based on the magnetic flux leakage 8 measured by the measurement step S41. The determination step S42 is not limited to determination of the abnormality in the region R based on the magnetic flux leakage 8 measured by the measurement step S41 and the intensity distribution, prepared by the preparation step S1, of the remanent magnetization in the region R.

The abnormality detected by the magnetic flaw detection method and the magnetic flaw detection apparatus 1 according to the above-described embodiment is not limited to the existence, position, size, and the like of a locally thin portion but may, for example, be only the existence of a locally thin portion, or any combination of the existence of a locally thin portion with the position and size thereof. The abnormality is not limited to a locally thin portion and may, for example, be a crack.

REFERENCE SIGNS LIST

1 Magnetic flaw detection apparatus
2 Magnetizing apparatus
3 Magnetic field measurement apparatus
4 Processing apparatus
5 Display apparatus
6 Magnetic field measurement processing apparatus
7 Object
8 Magnetic flux leakage
21 Magnet
21a Portion
22 Case
22a Portion
23 Hinge
24 Lock mechanism
25 Handle
31 Magnetic sensor substrate group
31a Magnetic sensor substrate
32 Control substrate
33 Output interface
34 Housing
35 Magnetic sensor group
35a Magnetic sensor
41 Input interface
42 Storage
43 Determiner
44 Output interface
51 Input interface
52 Screen
71 Pipe
72 Abnormal portion
O Axis
R Region
S1 Preparation step
S2 Magnetization step
S3 Sensor arrangement step
S4 Detection step
S5 Display step
S21 Magnet arrangement step
S22 Magnet movement step
S23 Magnet removal step
S41 Measurement step
S42 Determination step

The invention claimed is:

1. A magnetic flaw detection method comprising:
a magnetization step of moving a magnet in a predetermined direction along a surface of an object that is a magnetic body and subsequently removing the magnet from the surface of the object to magnetize a region corresponding to a movement range of the magnet on the object;
a sensor arrangement step of arranging a magnetic sensor to be capable of measuring magnetic flux leakage generated from an abnormal portion of the region that was magnetized in the object after the magnet is separated from the surface of the object to an extent that a magnetic field generated from the magnet does not have a magnetic effect on the object; and
a detection step of detecting an abnormality in the region with the magnetic sensor arranged by the sensor arrangement step.

2. The magnetic flaw detection method according to claim 1, wherein
in the sensor arrangement step, a magnetic sensor group including the magnetic sensor is arranged, and
$L1 \geq L2$, where L1 is a moving distance of the magnet in the predetermined direction in the magnetization step, and L2 is a length in the predetermined direction of the magnetic sensor group arranged to be capable of measuring the magnetic flux leakage.

3. The magnetic flaw detection method according to claim 2, wherein in the sensor arrangement step, the magnetic sensor group is arranged so that each magnetic sensor in the magnetic sensor group can measure the magnetic flux leakage.

4. The magnetic flaw detection method according to claim 1, further comprising
a preparation step of preparing, by testing or calculation in advance, an intensity distribution of remnant magnetization in the region to be magnetized by the magnetization step, wherein
in the sensor arrangement step, the magnetic sensor is arranged based on the intensity distribution of the remnant magnetization prepared by the preparation step.

5. The magnetic flaw detection method according to claim 4, wherein the detection step comprises a measurement step of measuring the magnetic flux leakage with the magnetic sensor and a determination step of determining the abnormality in the region based on the magnetic flux leakage measured by the measurement step and the intensity distribution, prepared by the preparation step, of the remnant magnetization.

6. The magnetic flaw detection method according to claim 1, wherein in the detection step, an abnormality in the region magnetized by the magnetization step is repeatedly detected over a predetermined period of time.

7. The magnetic flaw detection method according to claim 1, wherein
the object extends along a straight or curved axis,
the predetermined direction is a direction extending along the axis, and
the magnetization step comprises a magnet arrangement step of arranging the magnet so that the magnet forms a ring surrounding the object in a circumferential direction that encircles the axis, a magnet movement step of moving the magnet arranged by the magnet arrangement step in the predetermined direction, and a magnet removal step of removing the magnet from the object after the magnet movement step.

8. A magnetic field measurement processing apparatus comprising:
a storage configured to store model data that is prepared by testing or calculation in advance and indicates an intensity distribution of remnant magnetization in a region to be magnetized by a magnetization step of moving a magnet in a predetermined direction along a surface of an object that is a magnetic body and subsequently removing the magnet from the surface of the object to magnetize a region corresponding to a movement range of the magnet on the object;
a magnetic sensor arranged to be capable of measuring magnetic flux leakage generated from an abnormal portion of the region actually magnetized by the magnetization step after the magnet is separated from the surface of the object to an extent that a magnetic field generated from the magnet does not have a magnetic effect on the object; and a determiner configured to determine an abnormality in the region based on the model data and the magnetic flux leakage detected by the magnetic sensor.

9. The magnetic field measurement processing apparatus according to claim 8, further comprising
a magnetic sensor group including the magnetic sensor, wherein
$L1 \geq L2$, where L1 is a moving distance of the magnet in the predetermined direction in the magnetization step, and L2 is a length in the predetermined direction of the magnetic sensor group arranged to be capable of measuring the magnetic flux leakage.

10. A magnetic flaw detection apparatus comprising:
the magnetic field measurement processing apparatus according to claim 8, and the magnet, wherein
the object extends along a straight or curved axis,
the predetermined direction is a direction extending along the axis, and
the magnet is an openable and closable annular magnet configured to surround the object in a circumferential direction that encircles the axis.

* * * * *